US008028041B2

United States Patent
Olliphant et al.

(10) Patent No.: US 8,028,041 B2
(45) Date of Patent: Sep. 27, 2011

(54) DYNAMIC CONTENT FOR ONLINE TRANSACTIONS

(75) Inventors: Hugo Olliphant, San Francisco, CA (US); Ray Tanaka, San Jose, CA (US); Alan Tien, Shanghai (CN); Roy Vella, Twickenham (GB)

(73) Assignee: eBay Inc., San Jose, CA (US)

( * ) Notice: Subject to any disclaimer, the term of this patent is extended or adjusted under 35 U.S.C. 154(b) by 844 days.

(21) Appl. No.: 11/697,597

(22) Filed: Apr. 6, 2007

(65) Prior Publication Data

US 2007/0245022 A1 Oct. 18, 2007

Related U.S. Application Data

(60) Provisional application No. 60/790,198, filed on Apr. 7, 2006.

(51) Int. Cl.
*G06F 15/16* (2006.01)
(52) U.S. Cl. ........ 709/219; 709/217; 709/218; 709/223; 709/225; 705/35
(58) Field of Classification Search .................. 709/223, 709/225, 217–219; 705/35
See application file for complete search history.

(56) References Cited

U.S. PATENT DOCUMENTS

| 7,475,030 | B1* | 1/2009 | Tenorio | 705/26.8 |
| 2005/0044224 | A1* | 2/2005 | Jun et al. | 709/225 |
| 2005/0228750 | A1* | 10/2005 | Olliphant et al. | 705/40 |
| 2006/0036544 | A1* | 2/2006 | Dharam | 705/40 |
| 2006/0058037 | A1* | 3/2006 | Kenyon | 455/456.1 |
| 2006/0144925 | A1* | 7/2006 | Jones | 235/380 |
| 2006/0167793 | A1* | 7/2006 | Sachs | 705/40 |
| 2009/0210347 | A1* | 8/2009 | Sarcanin | 705/67 |
| 2009/0228816 | A1* | 9/2009 | Vilmos | 715/764 |
| 2009/0292642 | A1* | 11/2009 | Han | 705/71 |

* cited by examiner

*Primary Examiner* — Mohamed Wasel
(74) *Attorney, Agent, or Firm* — Haynes and Boone, LLP

(57) ABSTRACT

Various methods and systems provide dynamic content to users of online payment service providers without requiring users to log in or otherwise actively engage the payment service providers. In one example, a method includes providing a client device with access to an online marketplace over a network. The method also includes facilitating transmission of a user identifier stored by the client device to a payment service provider. The method further includes receiving dynamic content from the payment service provider in response to the user identifier. In addition, the method includes serving the dynamic content to the client device over the network.

20 Claims, 4 Drawing Sheets

DYNAMIC CONTENT FOR ONLINE TRANSACTIONS

CROSS-REFERENCE TO RELATED APPLICATIONS

This application claims the benefit of U.S. Provisional Patent Application No. 60/790,198 filed on Apr. 7, 2006 and entitled METHODS AND SYSTEMS TO GENERATE AND DISPLAY DYNAMIC MARKETING TEXT, which is incorporated herein by reference.

BACKGROUND

1. Field of the Invention

The present invention generally relates to online transactions and more particularly to the providing of content to facilitate online transactions.

2. Related Art

Customers routinely search for and purchase products and services through electronic communications with online merchants over electronic networks such as the Internet. During the course of these transactions, customers may provide payment in various ways including, for example, credit cards, electronic fund transfers, and other payment techniques offered by service providers.

Unfortunately, it is often difficult or inconvenient for customers to determine whether sufficient funds are available to make a desired purchase while visiting a merchant's website. For example, it is typically incumbent on customers to access their personal financial records, or visit a separate financial website in order to ascertain the current account balance associated with a desired method of payment. These additional steps can detract from customer online experiences and inconvenience consumers when making online purchases.

For merchants, such inconveniences can translate into potential lost sales to the extent that otherwise willing customers are deterred from completing online transactions. In particular, if customers are forced to visit other websites or retrieve locally-stored records before engaging in online transactions, customers may become distracted or attracted to a merchant's competitors while taking such actions.

SUMMARY

In accordance with an embodiment of the invention, a method of providing dynamic content includes providing a client device with access to an online marketplace over a network. The method also includes facilitating transmission of a user identifier stored by the client device to a payment service provider. The method further includes receiving dynamic content from the payment service provider in response to the user identifier. In addition, the method includes serving the dynamic content to the client device over the network.

In accordance with another embodiment of the invention, a method of providing dynamic content includes maintaining a user account comprising financial information associated with a user. The method also includes receiving a user identifier over a network. The method further includes associating the user identifier with the user account. In addition, the method includes determining dynamic content to be provided to the user. The method also includes serving the dynamic content over the network in response to the user identifier.

In accordance with another embodiment of the invention, a merchant system includes means for providing a client device with access to an online marketplace over a network. The merchant system also includes means for facilitating transmission of a user identifier stored by the client device to a payment service provider. The merchant system further includes means for receiving dynamic content from the payment service provider in response to the user identifier. In addition, the merchant system includes means for serving the dynamic content to the client device over the network.

In accordance with another embodiment of the invention, a payment service provider system includes means for maintaining a user account comprising financial information associated with a user. The payment service provider system also includes means for receiving a user identifier over a network. The payment service provider system further includes means for associating the user identifier with the user account. In addition, the payment service provider system includes means for determining dynamic content to be provided to the user. The payment service provider system also includes means for serving the dynamic content over the network in response to the user identifier.

These and other features and advantages of the present invention will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

In accordance with various embodiments disclosed herein, dynamic content can be provided to a user of an online payment service provider without requiring the user to log in or otherwise actively engage the payment service provider. For example, in one embodiment, dynamic content may be provided in response to a user's online shopping activities in relation to a merchant associated with the payment service provider. In other embodiments, dynamic content may be provided in response to a user's interaction with a client-side application such as a toolbar application or provided as a web feed such as an RSS feed.

In various embodiments, this dynamic content may be provided in the form of text, graphics, or other formats and may be used to provide any desired marketing information, financial information, transaction information, or other information which may be beneficial to a user, merchant, or payment service provider. For example, in one embodiment, such dynamic content may be provided to remind a user of an available account balance with a payment service provider. In another embodiment, such dynamic content may identify a merchant rating or other information which may be helpful to the user in determining whether to engage in an online transaction.

Figure 1:
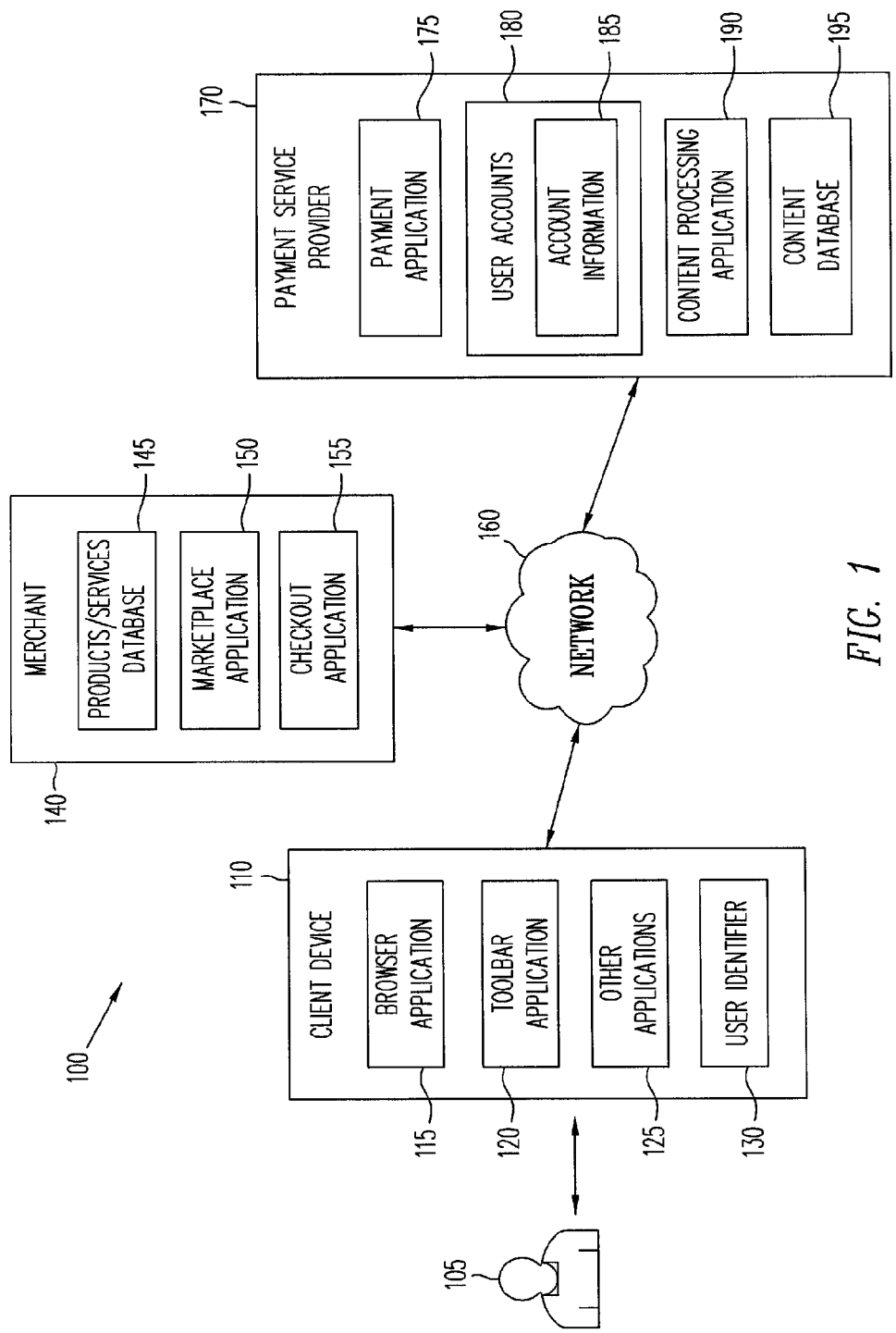
FIG. 1 illustrates a block diagram of a networked system configured to provide dynamic content in accordance with an embodiment of the invention.

Referring now to the drawings wherein the showings are for purposes of illustrating embodiments of the present invention only, and not for purposes of limiting the same, FIG. 1 illustrates a block diagram of a networked system 100 configured to provide dynamic content in accordance with an embodiment of the invention. As shown, system 100 includes a client device 110, a merchant server 140, and a payment service provider server 170 in communication over a network 160.

Network 160 may be implemented as a single network or a combination of multiple networks. For example, in various embodiments, network 160 may include the Internet or one or more intranets, landline networks, wireless networks, and/or other appropriate types of networks.

Client device 110 may be implemented using any appropriate combination of hardware and/or software configured for wired and/or wireless communication over network 160. For example, in one embodiment, client device 110 may be implemented as a personal computer of a user 105 (e.g., a customer) in communication with the Internet. In other embodiments, client device 110 may be implemented as a wireless telephone, personal digital assistant (PDA), notebook computer, and/or other types of computing devices.

As shown, client device 110 may include one or more browser applications 115 which may be used, for example, to provide a convenient interface to permit user 105 to browse information available over network 160. For example, in one embodiment, browser application 115 may be implemented as a web browser configured to view information available over the Internet.

Client device 110 may also include one or more toolbar applications 120 which may be used, for example, to provide client-side processing for performing desired tasks in response to operations selected by user 105. In one embodiment, toolbar application 120 may display a user interface in connection with browser application 115 as further described herein.

Client device 110 may further include other applications 125 as may be desired in particular embodiments to provide desired features to client device 110. For example, in various embodiments, such other applications 125 may include security applications for implementing client-side security features, programmatic client applications for interfacing with appropriate application programming interfaces (APIs) over network 160, or other types of applications.

As also shown in FIG. 1, client device 110 includes one or more user identifiers 130 which may be implemented, for example, as operating system registry entries, cookies associated with browser application 115, identifiers associated with hardware of client device 110, or other appropriate identifiers. In one embodiment, user identifier 130 may be used by a payment service provider to associate user 105 with a particular account maintained by the payment service provider as further described herein.

Merchant server 140 may be maintained, for example, by an online merchant offering various products and/or services in exchange for payment to be received over network 160. In this regard, merchant server 140 includes a database 145 identifying available products and/or services which may be made available for viewing and purchase by user 105. Accordingly, merchant server 140 also includes a marketplace application 150 which may be configured to serve information over network 160 to browser 115 of client 110. For example, in one embodiment, user 105 may interact with marketplace application 150 through browser application 115 over network 160 in order to search and view various products or services identified in database 145.

Merchant server 140 also includes a checkout application 155 which may be configured to facilitate the purchase by user 105 of goods or services identified by marketplace application 150. In this regard, checkout application 155 may be configured to accept payment information from user 105 and/or from payment service provider server 170 over network 160.

Payment service provider server 170 may be maintained, for example, by an online payment service provider which may provide payment on behalf of user 105 to the operator of merchant server 140. In this regard, payment service provider server 170 includes one or more payment applications 175 which may be configured to interact with client device 110 and/or merchant server 140 over network 160 to facilitate the purchase of goods or services by user 105 from merchant server 140. In one embodiment, payment service provider server 170 may be provided by PayPal, Inc.

Payment service provider server 170 also maintains a plurality of user accounts 180, each of which may include account information 185 associated with individual users. For example, in one embodiment, account information 185 may include private financial information of user 105 such as account numbers, passwords, credit card information, bank information, or other financial information which may be used to facilitate online transactions by user 105. Advantageously, payment application 175 may be configured to interact with merchant server 140 on behalf of user 105 during a transaction with checkout application 155 without requiring user 105 to provide account information 185 to merchant server 170.

Payment service provider server 170 also provides a content processing application 190 which may select content from a content database 195 to be provided to user 105. For example, in various embodiments, content processing application 190 may be implemented with appropriate rules-based or heuristics-based facilities for selecting appropriate content for user 105 based on, for example, user identifier 130, user account 180, account information 185, information received from merchant server 140, or other characteristics.

Optionally, merchant server 140 and/or payment service provider server 170 may be configured to provide a layered middle-ware service to selectively filter out identifying information, such as information which may identify user 105 to third parties. In this regard, appropriate filtering steps may be optionally performed prior to any of the various dynamic content serving steps discussed herein. As a result, system 100 may prevent user-identifiable information from being passed as dynamic content between client device 110, merchant server 140, and payment service provider server 170.

Figure 2:
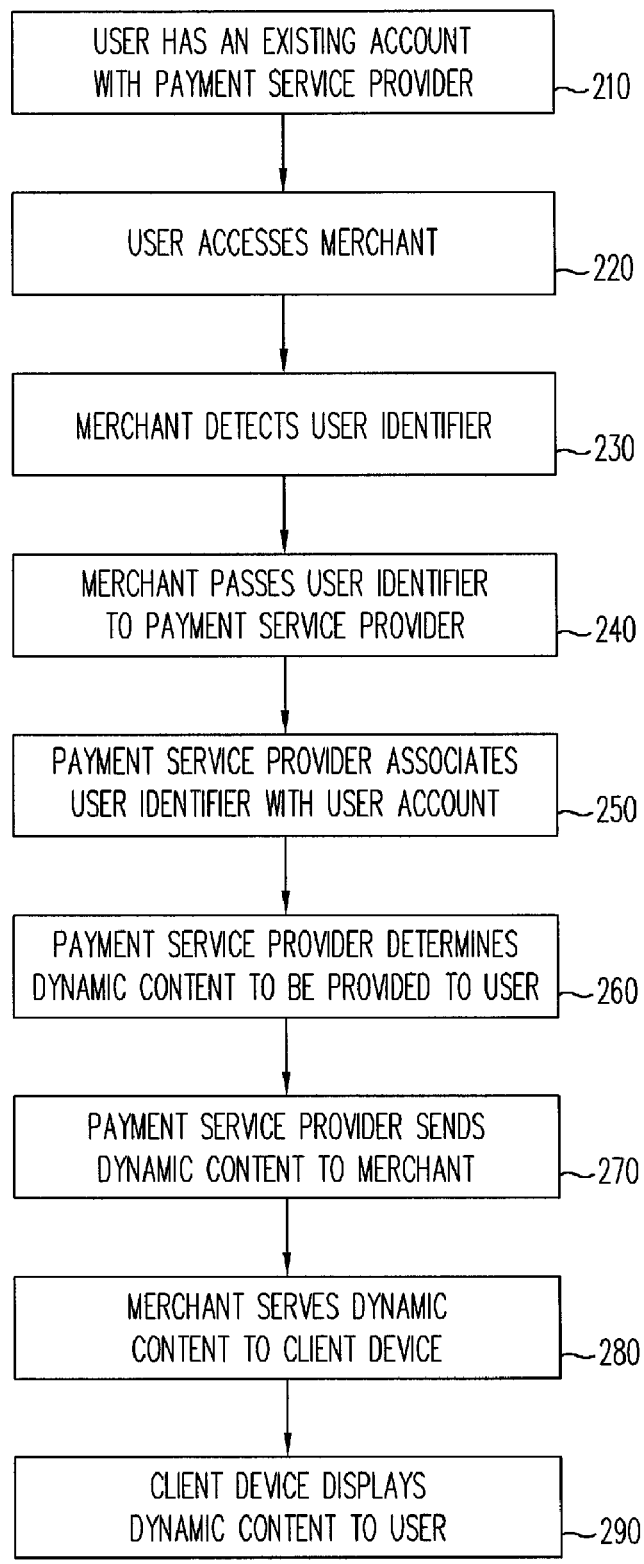
FIG. 2 illustrates a process of providing dynamic content to a user of an online marketplace in accordance with an embodiment of the invention.

FIG. 2 illustrates a process of providing dynamic content to user 105 in accordance with an embodiment of the invention. In initial step 210, it is assumed that user 105 has previously registered with payment service provider server 170 to open a user account 180. In this regard, it will be appreciated that user 105 may have previously provided account information 185 to payment service provider server 170 over network 160 through, for example, a secure connection between client device 110 and payment service provider server 170.

As a result of such previous registration, client device 110 stores a user identifier 130 that may be used to identify the particular user 105 as having a user account 180 maintained by payment service provider server 170. As previously described, user identifier 130 may be implemented, for example, as one or more cookies, operating system registry entries, hardware identifiers, or other types of identifiers.

In step 220, user 105 accesses an online marketplace provided by merchant server 140. For example, in one embodiment, user 105 may use browser application 115 to access a webpage provided by marketplace application 150 of merchant server 140. In this regard, marketplace application 150 may be configured to display various products or services identified in database 145. Also in step 220, user 105 may optionally select such products or services for purchase through interaction between browser application 115 and checkout application 155.

Figure 3:
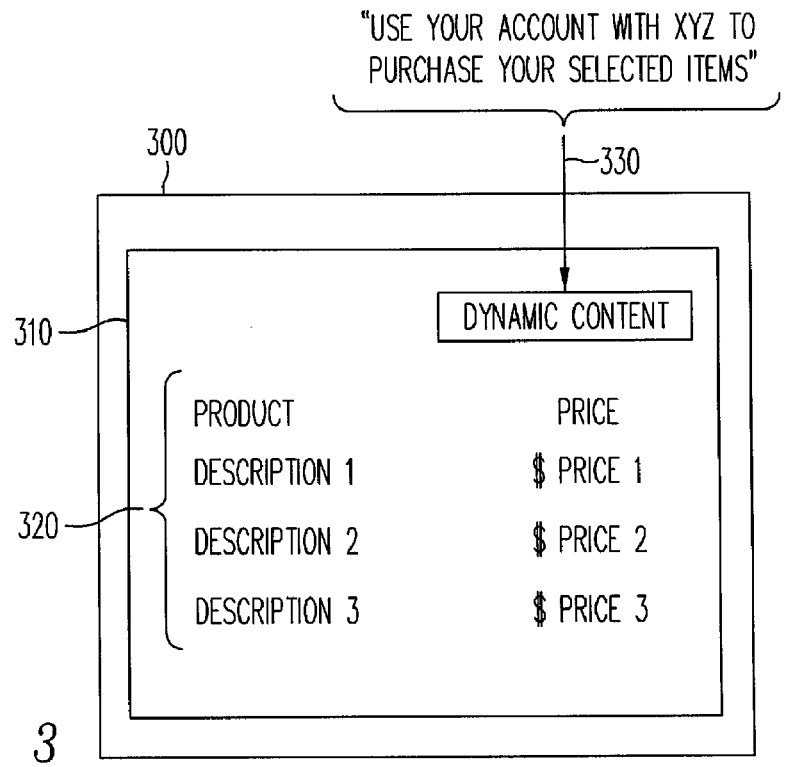
FIG. 3 illustrates a sample user interface displayed to a user of an online marketplace in during the process of FIG. 2 in accordance with an embodiment of the invention.

For example, FIG. 3 illustrates a sample user interface 300 that may be displayed to user 105 on client device 110 by browser application 115. In this regard, user interface 300 includes a browser window 310 provided by browser application 115 to display a dynamically created webpage. As shown, browser window 310 includes various product descriptions 320 provided by marketplace application 150 which correspond to various products selected by user 105 for viewing from marketplace application 150. Browser window 310 may initially be displayed without dynamic content 330. In this regard, dynamic content 330 may be subsequently displayed in browser window 310 in response to later steps in the process of FIG. 2 as further described herein.

Returning to FIG. 2, in steps 230 and 240, merchant server 140 may facilitate the transmission of user identifier 130 to payment service provider server 170. For example, in step 230, merchant server 140 detects user identifier 130 maintained by client device 110. In one embodiment where user 105 interacts with marketplace application 150 or checkout application 155 through browser application 115, merchant server 140 may be configured to read a user identifier 130 such as a cookie from user device 110.

Following detection step 230, merchant server 140 may request user identifier 130 from client device 110 and pass the detected user identifier 130 to payment service provider server 170 (step 240). Also in step 240, merchant server 140 may optionally pass additional information to payment service provider server 170. In various embodiments, such information may include, for example, information concerning the particular products or services viewed or selected by user 105, the browsing habits of user 105, previous transactions by user 105 with the merchant, an identifier associated with merchant server 140, or other information as may be appropriate in particular implementations.

In another embodiment, step 230 may be replaced by an alternate step in which merchant server 140 provides instructions such as program code to payment service provider server 170 to permit payment service provider server 170 to read user identifier 130 from user device 110. For example, in such an embodiment, merchant server 140 may be configured to serve a web page to payment service provider server 170 with embedded program code to facilitate the reading of user identifier 130 by payment service provider server 170. Also in such an embodiment, step 240 may be replaced by an alternate step in which payment service provider server 170 executes such program code to read user identifier 130 from user device 110. Accordingly, it will be appreciated that as a result of any of the various possible implementations of steps 230 and 240, merchant server 140 may facilitate the transmission of user identifier 130 to payment service provider server 170.

In step 250, payment service provider server 170 associates the user identifier 130 with the particular user account 180 of user 105. Following this association, content processing application 190 of payment service provider server 170 determines dynamic content to be provided to user 105 from content database 195 (step 260). For example, in one embodiment, content processing application 190 may select various content from content database 195 to be provided to user 105 based on, for example, user identifier 130, the user's account information 185, information passed by merchant server 140 in previous step 240, or other information.

As previously described, such dynamic content may be in the form of text, graphics, or other forms, and may correspond to provide any desired marketing information, financial information, transaction information, or other information which may be beneficial to a user, merchant, or payment service provider. For example, in one embodiment, such dynamic content may be configured to remind user 105 of existence of an account balance in user account 180. In such an embodiment, payment service provider server 170 may be implemented to not provide the actual account balance in order to protect the possible confidential nature of such information. In another embodiment, the dynamic content may be configured to provide user 105 with the actual account balance in user account 180. In either of these cases, dynamic content may be selected based on the current account balance identified by account information 185 of user account 180.

In another embodiment, dynamic content may be configured to advertise the availability of a payment service provider to complete a financial transaction with merchant server 140 on behalf of user 105. In this case, dynamic content may be selected based on the existence of a current user account 180 with payment service provider. It will be appreciated that any other type of dynamic content may be selected as may be desired for particular implementations.

In step 270, payment service provider server 170 sends the selected dynamic content to merchant server 140. In response, merchant server 140 serves the selected dynamic content to client device 110 (step 280).

In step 290, client device 110 displays the served content to user 105. For example, in one embodiment, browser application 115 may display a dynamically created webpage provided by merchant server 140 that includes one or more embedded JavaScript tags specifying the dynamic content provided by payment service provider server 170.

Referring again to user interface 300 of FIG. 3, it will be appreciated that dynamic content 330 may be displayed in browser window 310 by browser application 115 during step 290. In the embodiment of FIG. 3, dynamic content 330 is implemented as a message configured to remind user 105 to use an existing user account 180 to complete an online purchase with merchant server 140. However, it will be appreciated that dynamic content 330 may be implemented to display any information as may be desired in particular applications.

It will further be appreciated that, following step 290, user 105 may optionally elect to purchase products or services from merchant server 140 as desired. Advantageously, the user's decision to engage in such purchases may be influenced by the particular dynamic content displayed to the user during step 290.

Figure 4:
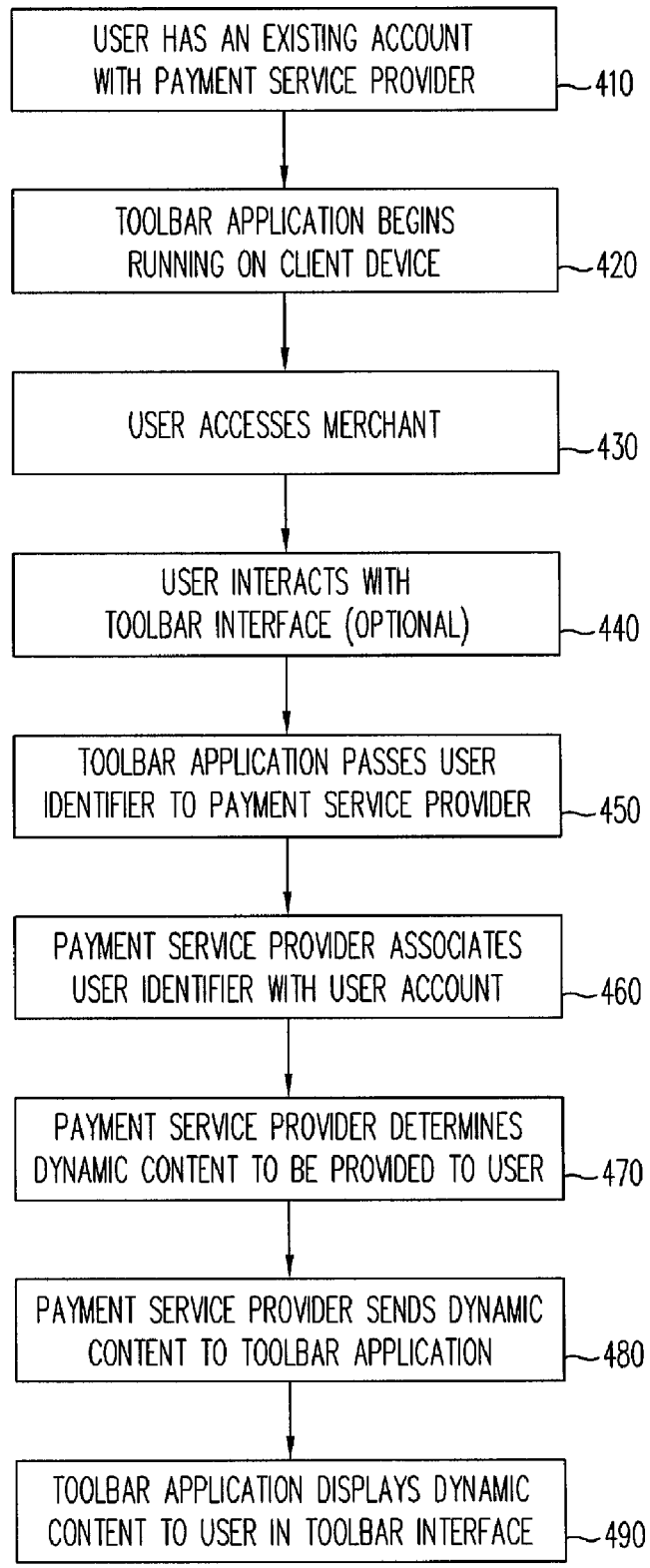
FIG. 4 illustrates a process of providing dynamic content to a user of an online marketplace in accordance with another embodiment of the invention.

FIG. 4 illustrates a process of providing dynamic content to user 105 in accordance with another embodiment of the invention. In initial step 410, it is assumed that user 105 has previously registered with payment service provider server 170 to open an account 180 as previously described with regard to step 210 of FIG. 2.

In step 420, toolbar application 120 begins running on client device 110. For example, in one embodiment, toolbar application 120 may be associated with browser application 115 and may begin running in response to user 105 using browser application 115 view a webpage provided by merchant server 140. In another embodiment, toolbar application 120 may begin running in response to a user-initiated command.

Figure 5:
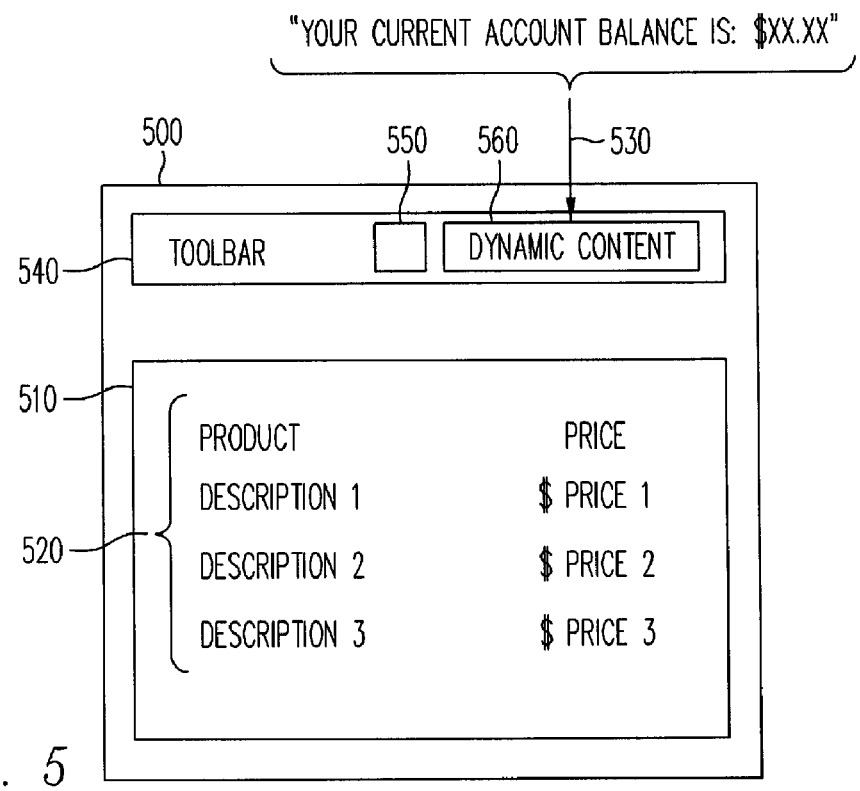
FIG. 5 illustrates a sample user interface displayed to a user of an online marketplace in during the process of FIG. 4 in accordance with an embodiment of the invention.

In step 430, user 105 accesses an online marketplace provided by merchant server 140 as previously described with regard to step 220 of FIG. 2. For example, FIG. 5 illustrates a sample user interface 500 that may be displayed to user 105 on client device 110 by browser application 115 and toolbar application 120. In this regard, user interface 500 includes a browser window 510 provided by browser application 115 to display a dynamically created webpage. As shown, browser window 510 includes various product descriptions 520 provided by marketplace application 150 which correspond to various products selected by user 105 for viewing from marketplace application 150.

User interface also includes a toolbar interface 540 which may be provided by toolbar application 120. In this embodiment, toolbar interface 540 includes a user-selectable button 550 which may be configured to respond to commands provided by user 105 through a suitable user input device of client device 110 such as a mouse, keyboard, or other input device.

Toolbar interface 540 also includes a content window 560 which may be used to display dynamic content 530 as further described herein. Content window 560 may initially be empty during step 430 and may subsequently display dynamic content 530 in response to later steps in the process of FIG. 4 as further described herein.

Returning to FIG. 4, in optional step 440, user 105 interacts with toolbar interface 540 by, for example, selecting button 550. Toolbar application 120 may be configured to perform various tasks in response to interaction by user 105 with toolbar interface 540. For example, in one embodiment, toolbar application 120 may be implemented to display dynamic content 530 in content window 560 in response to a user's selection of button 550.

Toolbar application 120 then passes user identifier 130 to payment service provider server 170 (step 450). In one embodiment, step 450 may be performed in response to interaction by user 105 with toolbar interface 540 in optional step 440. In another embodiment, toolbar application 120 may be configured to detect access by user 105 to a particular merchant in previous step 430. In this case, step 450 may be performed in response to such detection.

In step 460, payment service provider server 170 associates user identifier 130 with the particular user account 180 of user 105 as previously described with regard to step 250 of FIG. 2. Then, in step 470, payment service provider server 170 determines content 195 to be provided to user 105. For example, in one embodiment, content processing application 190 may select various content from content database 195 during step 470 to be provided to user 105 based on, for example, user identifier 130, the user's account information 185, the identity of merchant server 140, information passed by merchant 140, additional information passed by client device 110, or other information. It will be appreciated that the particular dynamic content 195 selected during step 470 may correspond to any of the various examples previously described in relation to the process of FIG. 2, or other content.

In step 480, payment service provider server 170 sends the selected content to toolbar application 120. Toolbar application 120 then displays the served content to user 105 in step 490.

Referring again to user interface 500 of FIG. 5, it will be appreciated that dynamic content 530 may be displayed in content window 560 by toolbar application 120 during step 490. In the embodiment of FIG. 5, dynamic content 530 is implemented as a message configured to inform user 105 of the actual balance of an associated user account 180. However, it will be appreciated that dynamic content 530 may be implemented to display any information as may be desired in particular applications.

It will further be appreciated that, following step 490, user 105 may optionally elect to purchase products or services from merchant server 140 as desired. Advantageously, the user's decision to engage in such purchases may be influenced by the particular dynamic content displayed to the user during step 490.

In view of the present disclosure, it will be appreciated that various methods and systems have been described for providing dynamic content to users of online payment service providers. Advantageously, such dynamic content may be served to user client devices without requiring users to log in or otherwise actively engage the payment service provider. In this regard, appropriate user identifiers may be passed by online merchants or client-side applications to authenticate users with payment service providers, without requiring users to actively perform a log in operation with respect to payment service provider servers.

It will be appreciated that such features can conveniently allow users to view relevant context-sensitive information which may be useful to performing online transactions. For example, by displaying a user account balance or merchant feedback information as dynamic content as described herein, merchants and payment service providers can reduce the likelihood of users visiting other websites or local records to determine such information. As a result, merchants and payment service providers can increase the likelihood of users to engage in online transactions.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the claims.

What is claimed is:

1. A method of providing dynamic content, wherein the method is performed by a merchant system, the method comprising:
   providing a client device with access to an online marketplace over a network;
   receiving at the merchant system a user identifier stored by the client device, wherein the user identifier is associated with a user account maintained by a payment service provider system;
   passing the user identifier from the merchant system over the network to the payment service provider system;
   receiving dynamic content at the merchant system over the network from the payment service provider system in response to the user identifier, wherein the dynamic content is determined by the payment service provider system; and
   serving the dynamic content from the merchant system over the network to the client device without requiring a user of the client device to actively engage with the payment service provider.

2. The method of claim 1, further comprising reading the user identifier from the client device.

3. The method of claim 1, further comprising providing instructions to the payment service provider system to permit the payment service provider system to read the user identifier, wherein the passing is performed in response to an execution of the instructions by the payment service provider system.

4. The method of claim 1, further comprising embedding the dynamic content in a webpage, wherein the serving comprises serving the webpage having the embedded dynamic content to the user device.

5. The method of claim 1, further comprising filtering out user-identifiable information from the dynamic content prior to the serving.

6. The method of claim 1, wherein the dynamic content comprises text.

7. The method of claim 1, wherein the dynamic content comprises a graphic image.

8. The method of claim 1, wherein the dynamic content identifies rating information associated with a merchant associated with the merchant system.

9. The method of claim 1, wherein the dynamic content identifies the existence of an account balance associated with the user account.

10. The method of claim 1, wherein the user identifier is a cookie stored by the client device.

11. The method of claim 1, wherein the user identifier is a registry entry of the client device.

12. A method of providing dynamic content, wherein the method is performed by a payment service provider system, the method comprising:
    maintaining a user account comprising financial information associated with a user of a client device;
    receiving a user identifier from a merchant system over a network;
    associating the user identifier with the user account;
    determining dynamic content to be provided to the user client device from the merchant system; and
    serving the dynamic content from the payment service provider system over the network to the merchant system in response to the user identifier without requiring the user of the client device to actively engage with the payment service provider.

13. The method of claim 12, further comprising receiving user browsing information from the merchant system over the network, wherein the determining is performed using the browsing information.

14. The method of claim 12, further comprising filtering out user-identifiable information from the dynamic content prior to the serving.

15. The method of claim 12, wherein the dynamic content comprises text.

16. The method of claim 12, wherein the dynamic content comprises a graphic image.

17. The method of claim 12, wherein the dynamic content corresponds to rating information associated with a merchant associated with the merchant system.

18. The method of claim 12, wherein the dynamic content identifies the existence of an account balance associated with the user account.

19. The method of claim 12, wherein the user identifier is a cookie stored by the client device.

20. The method of claim 12, wherein the user identifier is a registry entry of the client device.

* * * * *